(12) United States Patent
Kappler et al.

(10) Patent No.: US 7,372,857 B1
(45) Date of Patent: May 13, 2008

(54) METHODS AND APPARATUS FOR SCHEDULING TASKS

(75) Inventors: Christopher J. Kappler, Waltham, MA (US); Gregory S. Goss, Dunstable, MA (US); Scott C. Smith, Mansfield, MA (US)

(73) Assignee: Cisco Technology, Inc., San Jose, CA (US)

( * ) Notice: Subject to any disclaimer, the term of this patent is extended or adjusted under 35 U.S.C. 154(b) by 996 days.

(21) Appl. No.: 10/446,597

(22) Filed: May 28, 2003

(51) Int. Cl.
*H04L 12/56* (2006.01)
(52) U.S. Cl. .................................. 370/395.4
(58) Field of Classification Search ............. 370/395.4, 370/85.13; 395/492
See application file for complete search history.

(56) References Cited

U.S. PATENT DOCUMENTS

| | | | |
|---|---|---|---|
| 5,555,405 A * | 9/1996 | Griesmer et al. ............ 707/205 |
| 6,628,610 B1 | 9/2003 | Waclawsky et al. ........ 370/229 |
| 6,643,260 B1 | 11/2003 | Kloth et al. ................ 370/235 |
| 6,687,247 B1 | 2/2004 | Wilford et al. ............. 370/392 |
| 6,724,721 B1 | 4/2004 | Cheriton .................... 370/229 |
| 6,798,746 B1 | 9/2004 | Kloth et al. ................ 370/235 |
| 6,876,952 B1 | 4/2005 | Kappler et al. |
| 6,891,834 B1 * | 5/2005 | Dally et al. ............. 370/395.4 |
| 2003/0231630 A1 | 12/2003 | Messenger |

OTHER PUBLICATIONS

Petrie, Michael C., Kuehner, Nathaniel P., and Lupa, Piotr K., "Astro Simulcast System Throughput Optimization via Launch Time Offset Auto Calibration," Mar. 18, 2002, Motorola, Inc., IP.com Prior Art Database, pp. 1-2.
U.S. Appl. No. 10/446,981, filed May 28, 2003, entitled "Methods and Apparatus for Scheduling Operation of a Datasource."

* cited by examiner

*Primary Examiner*—Hassan Kizou
*Assistant Examiner*—Emmanuel Maglo
(74) *Attorney, Agent, or Firm*—BainwoodHuang

(57) ABSTRACT

Queues are scheduled for outputting data using a hierarchical tree. Each level of the hierarchical tree includes multiple entries for storing status information associated with the queues. For example, a given entry of the tree stores multi-parameter status information associated with a corresponding queue to be serviced. To determine which of the queues is next in line for servicing, a logic circuit compares the multi-parameter status information stored in two or more entries of the tree. The next scheduled queue or highest priority queue in the tree is then serviced by outputting at least some of its data.

29 Claims, 7 Drawing Sheets

METHODS AND APPARATUS FOR SCHEDULING TASKS

RELATED APPLICATION

This application relates to U.S. patent application Ser. No. 10/446,981 entitled "Methods And Apparatus For Scheduling Operation of a Data Source," filed even date herewith, the entire teachings of which are incorporated herein by this reference.

BACKGROUND OF THE INVENTION

In general, schedulers manage when to allocate system resources to service different tasks. When employed in router applications, schedulers manage many queues and ensure overall fairness of outputting data packets from the queues by selectively servicing queues at different times. Queues are sometimes guaranteed at least a minimal rate of outputting data. Consequently, it is important to service such queues often enough so that the queue outputs data at the corresponding guaranteed rate and the queues do not become congested with data.

One implementation of a scheduler is a calendar. Calendars schedule servicing of tasks in real-time by maintaining linked lists. Each linked list includes task entries that are to be serviced in a particular time slot of the calendar. As a real-time clock advances, tasks stored as entries in the linked lists are serviced. In one application, scheduled tasks includes servicing one or more queues.

A linked list typically includes a head pointer, a tail pointer and next pointers. Thus its size is almost entirely determined by how many things it contains. A calendar is an array of linked lists. Thus, a calendar consumes space for a head and tail pointer for each slot it maintains. In one application, a calendar including 256 slots includes 256 head pointers and 256 tail pointers. If each pointer is 2 bytes, the 256 slot calendar consumes 1 Kilobyte. If a scheduler maintains 100 such calendars for scheduling independent tasks, then 100 kilobytes of memory is required to maintain these calendars.

In the context of a router application, it is not uncommon to schedule over thirty thousand independent groups of (tasks) queues for servicing. Maintaining many calendars is sometimes inefficient. For example, if hundreds of thousands of queues divided into 32,000 groups, there is a need for 32,000 calendars. Consequently, this would require 32 Megabytes of storage (e.g., at 1 Kilobyte per calendar). If the calendars are more granular and include 1024 slots each, such a system of 32,000 calendars consumes 256 Megabytes.

Another implementation of a scheduler is a sorting tree such as a heap or a B-tree. In these applications, tasks are scheduled for servicing based on their relative priority, which indicates precedence in an arbitrarily complex service ordering. For example, an entry at a highest root node of the tree stores a highest priority task for servicing. After servicing the highest priority task, the tree is updated so that the next highest priority task moves to the highest root node of the tree.

SUMMARY

There are deficiencies associated with the use of calendars to schedule outputting data from multiple queues. For example, as discussed, an enormous amount of memory may be necessary to schedule independent groups of tasks such as servicing queues in real-time. In addition to requiring a large amount of memory resources, a proportional amount of processing power is required to maintain the calendars as they are updated over time. Transmit scheduling is a complex operation, often iterated over many layers of scheduling hierarchy. For this reason, high speed memories are often desirable. The above example requires 256 Megabytes, which surpasses the current generation of SRAM (Static Random Access Memory) devices. It also exceeds the limitations of high speed on-chip RAM technology in ASICs (Application Specific Integrated Circuits). Consequently, although calendars do not directly increase the performance needs of a system, they do increase the memory footprint to a size at which highest speeds of memory processing become impossible. Thus, it can be an especially unwieldy task to maintain calendars for each of tens of thousands of groups of queues that must be serviced.

Another deficiency associated with calendars is that a fixed amount of memory resources is used to obtain a particular sorting resolution. For example, to perform scheduling of queues with 8 bit time-stamps, 256 slots or 1 Kilobytes is a possible calendar size. To perform scheduling of queues with 10 bit time-stamps, 1024 slots of 4 Kilobytes is a possible calendar size. In effect, the calendar consumes a memory footprint proportional to its resolution.

Although hierarchical trees tend to be more space efficient than calendars for scheduling, there are deficiencies associated with their use. For example, in heap-based schedulers having many levels, it is typically a time-consuming process to locate a particular task entry in the tree because task entries can move sideways in the tree as a result of reorganizing the tree after servicing highest priority tasks. Consequently, searching for the particular task entry is not limited to searching a subset of nodes in the tree. Rather, the whole tree must be searched to locate a the particular task entry.

One aspect of the present invention involves scheduling an output of data from multiple queues using a hierarchical tree. Each level of the tree includes multiple entries for storing status information associated with the queues. For example, a given entry of the tree stores multi-parameter status information associated with a corresponding queue. To determine which of the queues has a higher associated priority for servicing, a logic circuit compares the multi-parameter status information stored in two or more entries of the tree.

As its name suggests, the multi-parameter status information includes multiple parameters of status information associated with a particular queue to be serviced. Typical parameters maintained for each of the queues include status information such as queue ID (identification), data type, fullness of queue, and time stamp information. In addition to these parameters, any other suitable parameter associated with the queues can be used to determine which queue entry in the tree is next scheduled for servicing.

A relative priority or scheduling of which of multiple queues to service next depends on the status of the multiple parameters associated with the queues. For example, certain queues can be afforded highest priority for servicing over all other queues simply because of the type of data stored in a queue. The "data type" parameter (status information) may identify one of multiple different types of possible data stored in the queues. The "data type" parameter may also indicate what sorting treatment shall be applied to a given entry (queue). In a typical case, this is determined by the type of data that tends to flow through the queue. However, in more complex cases, the data type can dynamically change based on an implementation or system conditions.

The data type parameter may indicate that a particular queue stores lower priority data. After being identified as storing lower priority data information based on data type status information, such queues can be serviced according to a secondary parameter such as the relative age of time stamps associated with the queues. For example, time stamps can indicate which of potentially multiple queues in a particular class shall be serviced first.

Yet another parameter such as "fullness" of a queue identifies whether a queue is full or empty. If empty, a queue is classified at a lowest level of priority for servicing because it has no data to output and thus does not need servicing.

This technique of comparing multi-parameter status information associated with the queues increases the flexibility of scheduling queues for servicing because an urgency or priority for servicing queues depends on multiple parameters. Consequently, queues can be categorized into one of many more types of priority classes and sub-classes than if a single parameter is used to prioritize queues for servicing.

The hierarchical tree is optionally maintained so that each queue has a corresponding entry in the tree regardless of whether the corresponding queue is empty. In this embodiment, the multi-parameter status information associated with a corresponding queue includes a status bit indicating whether the queue is filled with any data. In the event that an empty queue becomes at least partially filled with data, the entry in the tree associated with the newly active queue is simply updated with new multi-parameter status information to indicate the corresponding queue is non-empty. Consequently, once updated, the newly active queue can vie for being serviced again merely because the status information associated with the queue as stored in the tree indicates that the queue is active again.

In one application, the hierarchical tree is split into two levels including a parent level and a child level. Queues having corresponding status information stored in entries at the parent level of the tree generally have a higher associated priority for servicing than those stored in related entries at the child level of the tree. To determine which queue has a highest associated priority for being serviced, multiple entries at the parent level of the tree are compared. For example, multi-parameter status information for each of multiple queues are compared to determine which has a higher relative priority for servicing.

After servicing a queue at a parent level of the tree by outputting data from the queue, the multi-parameter status information (i.e., entry in the tree) associated with the serviced queue is updated. This involves modifying the entry in the tree corresponding to the serviced queue. After modification, entries of the tree are then compared again and reorganized so that multi-parameter status information associated with the highest priority queues are stored at the parent level of the tree.

Each parent entry of the tree has a related array of child entries at a next lower level of the tree. After a queue is serviced, the updated status information associated with the serviced queue at the parent level of the tree is compared to the priority associated with queues stored at the related child level of the tree. If an entry at a child level of the tree has a higher priority than the recently serviced queue, the updated entry associated with the serviced queue at the parent level of the tree is swapped with the higher priority child entry. In this way, the parent level of the tree includes the highest priority queues for servicing.

In one application, the parent level of the tree includes an array of at least eight entries. For each entry at the parent level, a corresponding array of entries is maintained at a child level of the tree. Thus, a two-level tree can support scheduling of many queues for servicing. In one application, 32 entries are supported at each level of a two-level tree such that the tree maintains scheduling for up to 1024 queues.

The tree is optionally a two-level searchable heap. In this case, reducing the number of levels of the tree to a single parent and child level (two levels) renders it easier to find an entry corresponding to a particular queue when its corresponding multi-parameter status information needs to be updated. In another application, the hierarchical tree is a B tree instead of a two-level heap. Entries are easy to find in a B-tree because the entries do not migrate horizontally within levels of the tree.

The hierarchical tree is stored in a memory device and arrays of entries are optionally stored in contiguous space of the memory device for easy access. For example, an array of entries at a parent level of the tree is optionally stored in a common row of the memory device. Similarly, an array of entries at a child level of the tree is optionally stored in another row of the memory device. In this embodiment, after reading a row of data stored in the memory device, the status information associated with multiple queues are compared to identify which queue is next in line for servicing. In one application, the memory device is located in on-chip memory of an ASIC (Application Specific Integrated Circuit). Such devices are desirable because they support access to many bits in a single READ operation.

The aforementioned techniques of scheduling queues for servicing using a tree are preferable over conventional techniques. Note that scheduling an output of data from even a single queue can require considerable memory and processor resources. In certain applications, hundreds of thousands of queues are managed for tens of thousands of groups, thus rendering it proportionally more difficult to schedule queues for servicing over time.

Use of a hierarchical tree to schedule queues for servicing requires less resources than conventional methods. Consider that each entry of the tree stores multi-parameter status information associated with a corresponding queue. If each queue has an associated thirty-two bits of multi-parameter status information to store in each entry, a tree scheduling one thousand queues for servicing is only 32 kilobits. This is considerably less memory than that required by calendars scheduling a similar number of queues for servicing.

The technique of comparing multi-parameter status information stored in the hierarchical tree to service queues provides increased flexibility for scheduling tasks over conventional methods. For example, one parameter of status information associated with the queues is used to categorize the queues into different classes. Another parameter associated with the queues differentiates classes of queues into further sub-classes. Queues are then serviced based on a relative priority associated with their classes. For those queues in the same class, the queues are prioritized for scheduling based on their sub-class derived by a secondary parameter.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily drawn to scale, emphasis instead being placed upon illustrating the principles of the present invention.

DETAILED DESCRIPTION

Networking devices such as routers implement hundreds, thousands, tens of thousands, or hundreds of thousands of data queues to temporarily store data packets for later transmission to intended targets. In such applications, data information is initially stored in a selected queue before it is eventually retransmitted from an output port of the router to the appropriate destination. As a result of ever-increasing demand for bandwidth (e.g., Internet access) and simultaneous sharing of routers, queues in the routers can be inundated with an excessive inflow of data. On the back end of the router, the one or more queues are scheduled for servicing so that each queue is fairly serviced by outputting data. If the queues are not serviced on a regular basis, clients can't be guaranteed at least a minimal rate of transferring data through a router.

As discussed, one aspect of the present invention involves scheduling queues for servicing based on the use of a hierarchical tree. Scheduling queues for servicing ensures that queues are serviced fairly with respect to each other. Each level of the tree includes multiple entries for storing bits of information associated with the queues. For instance, a given entry of the tree stores multi-parameter status information associated with a corresponding queue. To determine which of the queues is scheduled for servicing next (or which of multiple queues has a higher associated priority), a logic circuit compares the multi-parameter status information associated with each of two or more queues at a same level of the tree. The highest relative priority queue is then serviced by outputting its data.

This technique of comparing multi-parameter status information associated with the queues increases the flexibility of scheduling queues for servicing. For example, instead of comparing a single parameter such as a time stamp for each of multiple queues to determine which queue has a highest associated relative priority, additional queue status information such as data type or other status information associated with the queue is also used to identify which of the queues is next in order for servicing.

Although the techniques described herein can be used in networking applications, and particularly to scheduling an output of data information from one or multiple queues of a network device, the techniques are also well-suited for other applications. For example, the technique of scheduling tasks can be extended to any computer, processing or task management system. Thus, scheduling of tasks is not limited to outputting data packets from queues in a data communications device.

Figure 1:
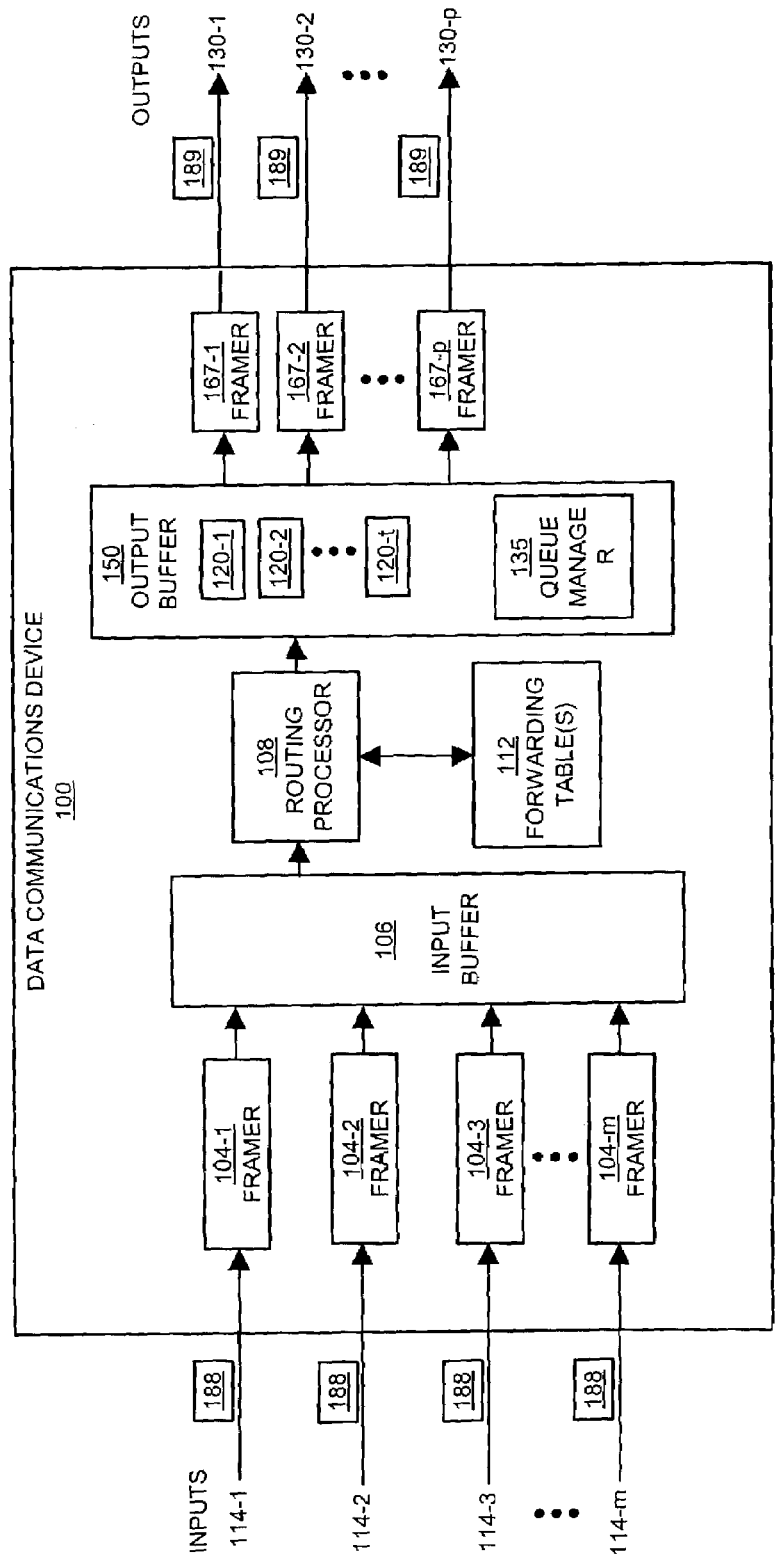
FIG. 1 is a block diagram of a data communications device for processing an inflow and outflow of data information.

FIG. 1 is a block diagram of data communications device 100 including output buffer 150 that schedules an output of data packets 189 stored in queues 120. As shown, data communications device 100 includes framers 104-1, 104-2, . . . , 104-$m$, input buffer 106, routing processor 108, forward tables 112, output buffer 150, and framers 167. Output buffer 150 includes queues 120-1, 120-2, . . . , 120-$t$, and queue manager 135.

In the context of a router or networking device, data information such as TCP/IP (Transmission Control Protocol/Internet Protocol) data packets 188 are received on input ports 114-1, 114-2, . . . , 114-$m$ of data communications device 100. Typically, in this context, input ports 114 and output ports 135 are hardwired electronic cables, wireless links, and/or optical fibers of a communication network.

Data packets 188 received at input ports 114-1, 114-2, . . . , 114-$m$ are processed via corresponding framers 104-1, 104-2, . . . , 104-$m$ into frames of binary encoded information. In one application, framers 104 process incoming data by stripping excess information in a packet 188 down to its data payload intended for a target.

Based on a type of received data information, framers 104 process packets 188 and store them in input buffer 106. In situations of high traffic, data communications device 100 is configurable and drops incoming data packets 188 according to a policing function.

Routing processor 108 utilizes forwarding tables 112 to repackage data packets 188 stored in buffer 106 to include address information for appropriate transmission to an intended downstream target.

In accordance with the techniques as previously discussed, the repackaged data packets 189 are temporarily stored in potentially one of hundreds of thousands of queues 120 for later transmission on output ports 130-1, 130-2, . . . , 130-$p$. Each physical output port 130 may be broken down into multiple logical sub-ports. Each logical sub-port outputs data packets 189 from assigned queues 120. Framers 167-2, 167-2, . . . , 167-$p$ process data outputted from output buffer 150 for transmission on outputs 130.

Among other tasks, one purpose of queue manager 135 is to schedule the output of data packets 189 from queues 120. In general, scheduling queues (or tasks) for servicing can be cumbersome simply because of the potentially large number of queues (or tasks) that must be serviced. Techniques according to the principles of the present invention overcome this hurdle by providing a scheduler that is easily searched, modified and maintained even though it schedules many queues 120 (tasks) for servicing.

Each of multiple queues 120 are, at times, filled with new data packets 189 for transmission to intended downstream communications devices. Queues 120 are serviced by outputting data packets 189 on output port 135. In one application, queues 120 are FIFO (First-In-First-Out) memory devices. Any suitable memory device such as RAM (Random Access Memory), SRAM (Static RAM), FIFO, registers, and combinational logic (OR gates, AND, gates, . . . ) can be used to fabricate queues 120.

It should be noted that data communications device 100 optionally supports either or both connection-oriented routing and packet-switched routing (connectionless routing). In connection-oriented routing, related data packets 188 are transmitted along an established common connection path in a network. In packet-switched routing, small units of data information such as data packets are relayed through nodes of a computer network along the best available route between a source node and destination node.

Figure 2:
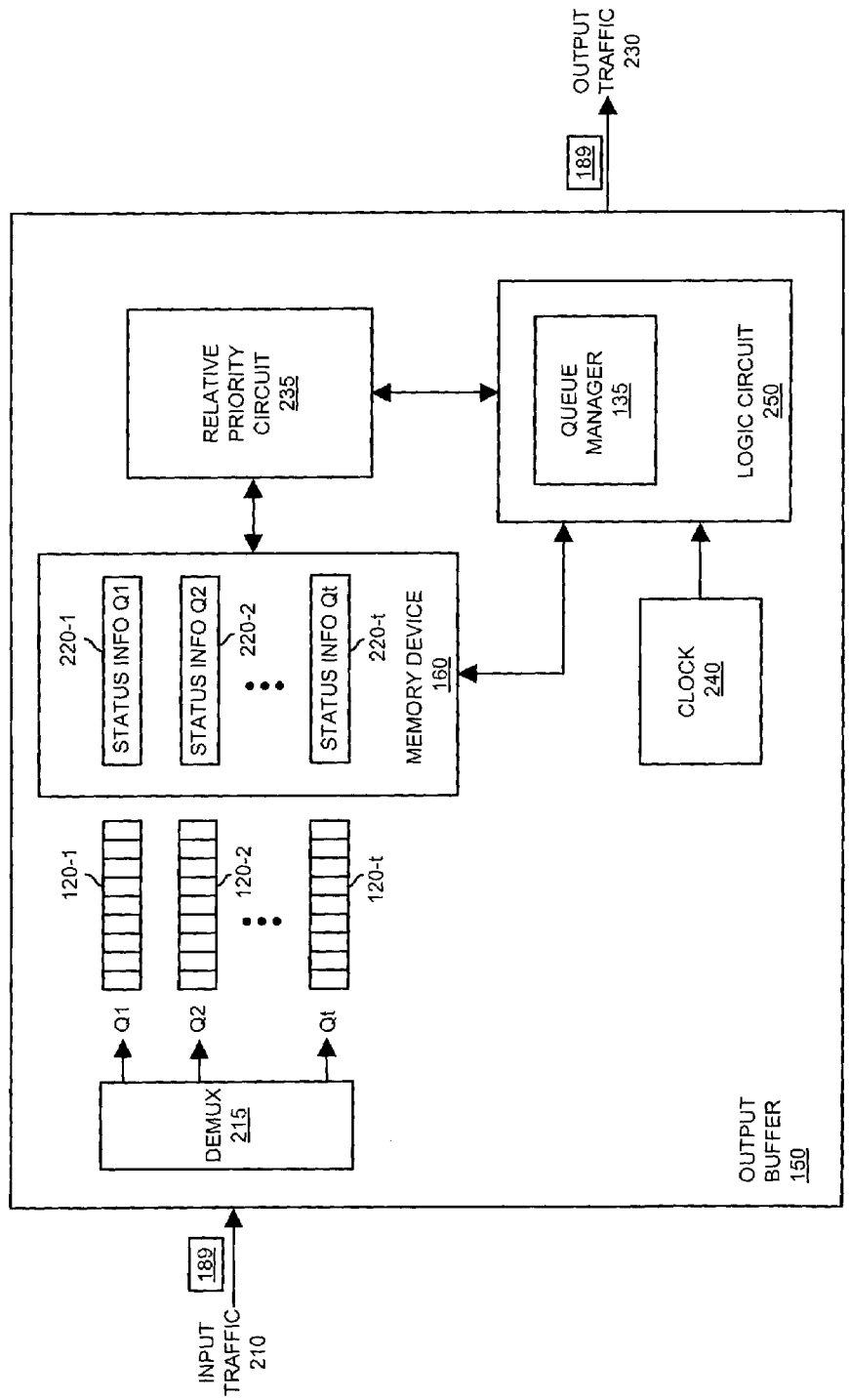
FIG. 2 is a detailed block diagram of an output buffer including multiple queues that are scheduled for outputting data.

FIG. 2 is a detailed block diagram of output buffer 150 associated with communications device 100. As shown, output buffer 150 includes demultiplexer 215, queues 120-1, 120-2, . . . , 120-t (also labeled Q1, Q2, . . . Qt, respectively), corresponding status information 220-1, 220-2, . . . , 220-t, relative priority circuit 235, logic circuit 250, queue manager 135, and clock 240.

Generally, input traffic 210 such as variable length data packets 189 are stored in queues 120. Upon receipt of input traffic 210, demultiplexer 215 selects which of multiple queues 120 to temporarily store each data packet 189 based on forwarding information. Data packets 189 are eventually transmitted as output traffic 230 on output ports 130.

In one application, the choice of which queue 120 to store a data packet 189 depends on a QoS (Quality of Service) associated with the data packet 189. More specifically, data communications device 100 may be required to store data packet 189 in a queue 120 that enables an intended target destination to receive the data within a particular amount of time associated with the QoS class of the data packets 189 (i.e., within a particular delay bound).

Certain queues 120 are expected to output data packets 189 at a particular data rate. For example, Q1 is optionally assigned to have an expected rate of outputting 10 megabits of data information every second. In a similar way, Q2 may be assigned to support an expected output rate of 4 megabits of data information every second, and so on. Each queue can be assigned a different rate or same expected output rate for outputting data.

Each queue 120 that is serviced has its associated multi-parameter status information 220 stored in memory device 160. Generally, multi-parameter status information 220 associated with queues 120 are compared to determine which of queues 120 is scheduled next for servicing. More specific details of the multi-parameter status information 220 can be found in the following figures and related text.

Logic device 250 and, more specifically, queue manager 135 perform the task of controlling the flow of output traffic 230 from queues 120. Output traffic 230 includes a mix of data packets 189 from different queues 120. As mentioned earlier, some queues 120 are serviced at a higher rate while others are serviced at a lower rate. In general, the scheduling of queues 120 is achieved by comparing multi-parameter status information 220 stored in memory device 160 via relative priority circuit 235.

Relative priority circuit 235 compares the multi-parameter status information 220 associated with queues 120 via logic networks (such as combinational logic including OR gates, AND gates, registers and other logic) to determine which queue 120 shall be serviced next by outputting some of its data. Compare results from relative priority circuit 235 are driven to logic circuit 250 so that it can determine which queue 120 shall be serviced next.

All or a portion of functions supported by logic device 250, relative priority circuit 235 and/or memory device 160 are implemented in one or more ASIC (Application Specific Integrated Circuit) devices such as an FPGA (Field Programmable Gate Array). Alternatively, functions of relative priority circuit 235 and/or logic device 250 (and queue manager 135) are performed by a microprocessor executing a set of instructions to maintain contents of memory device 160 and thus schedule servicing of queues 120.

Figure 3:
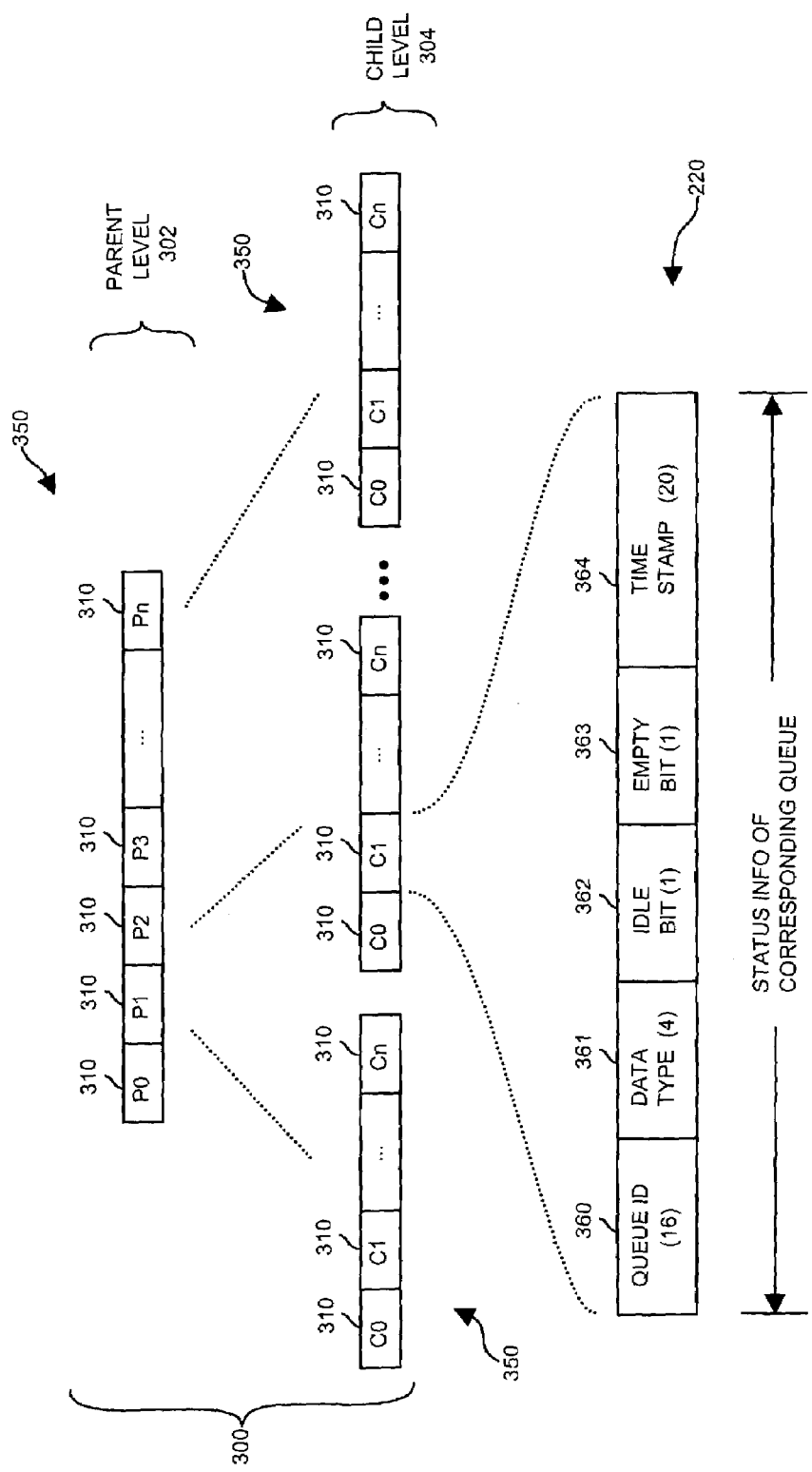
FIG. 3 is a hierarchical tree that schedules queues for servicing.

FIG. 3 is a diagram of hierarchical tree 300 that schedules queues 120 for outputting data packets 189. As shown, hierarchical tree 300 stores multi-parameter status information 220 associated with queues 120.

Each entry 310 in hierarchical tree 300 stores multi-parameter status information 220 associated with a corresponding queue 120. In the context shown, multi-parameter status information 220 includes 32 bits of data associated with a corresponding queue 120. The number of parameters for each queue 120 and number of bits in each data field can vary depending on the application.

By way of example, data field 360 stores sixteen (16) bits of queue identification information. The queue ID information identifies to which queue 120 the particular multi-parameter status information 220 pertains. Based on reading the queue ID information, logic circuit 250 identifies which queue 120 is associated with the corresponding entry 310 in hierarchical tree 300. A length of data field 360 can be increased so that one of many queues 120 can be identified. For example, if hierarchical tree 300 schedules 1024 different queues 120 for servicing, queue ID is 10 bits in length.

Typically, data field 361 stores four (4) bits of data identifying a type of data stored in a corresponding queue 120. Certain queues 120 are given priority of servicing over others based on a type of data stored in a queue 120. Thus, data field 361 can be processed to immediately identify if a highest priority queue 120 shall be serviced over all other queues 120.

Data field 362 stores one (1) bit of status information indicating whether the corresponding queue 120 is in an idle mode (e.g., the corresponding queue 120 is active, but is presently disabled from outputting data packets 189). If a queue 120 is in the idle mode, it is generally given lower relative priority status and is not serviced by outputting any data packets 189.

Data field 363 stores one (1) bit of information identifying whether a corresponding queue 120 is empty. If a queue 120 is empty, it is not given priority for servicing.

Lastly, data field 364 stores up to twenty (20) bits of time stamp information associated with the corresponding queue 120. In one application, the time stamp information indicates a relative age of a corresponding queue 120. For those queues 120 storing a similar type of data packets 189 (FIG. 2), the time stamp information distinguishes which of the multiple queues 120 will be serviced next. Older time stamps indicate higher priority queues 120 for servicing in a particular class.

It should be noted that the number of parameters tracked for each queue 120 can vary. For example, not every queue 120 maintains a time stamp value in associated multi-parameter status information 220. If a queue 120 has a highest associated priority for servicing based on data type status bits (in data field 364) associated with a queue 120, then actual time stamp information may serve no purpose. In this instance, such a queue 120 is destined to be serviced before all others and no secondary parameters are needed to identify whether it is a highest priority queue 120 for servicing.

Hierarchical tree 300 includes array 350 of entries 310 at parent level 302 and multiple arrays 350 of entries 310 at child level 304. In general, each entry 310 at parent level 302 of hierarchical tree 300 has a corresponding array 350 of entries 310 at child level 304 of hierarchical tree 300.

It should be noted that the number of entries 310 in an array 350 can vary depending on the application. For example, each array 350 can maintain a different or same number of entries 310. The number of parameters tracked for each queue 120 can vary. For example, not every queue 120 tracks an associated time stamp.

In one application, n=31 and array 350 at parent level 302 of tree 300 maintains multi-parameter status information 220 associated with thirty-one higher relative priority queues 120 (namely, P1, P2, P3, . . . , P31). P0 is not used so that hierarchical tree 300 fits conveniently in memory device 160. In this instance, since each entry 310 at parent level 302 has an associated array 350 at child level 304, there are a total of thirty-two arrays 350 of entries 310: one array 350 at parent level 302 and thirty-one corresponding arrays 350 at child level 304.

Entry P0 is optionally used so that tree 300 comprises thirty-three arrays 350, each having thirty-two entries 310 apiece.

As briefly discussed, each of queues 120 having corresponding entries 310 at parent level 302 of tree 300 has a related array 350 of entries 310 at child level 304 of tree 300. Generally, the highest relative priority among thirty-three queues 120 is stored in an entry 310 at parent level 302 of tree 300. For example, a highest relative priority queue 120 among P1 and thirty-two corresponding array 350 at child level 304 is stored in P1.

The number of entries 310 in an arrays 350 can be fixed. For example, each array 350 at child level 304 can include 32 entries 310 for storing multi-parameter status information 220 associated with thirty-two corresponding queues 120.

Alternatively, the number of entries in an array 350 is configurable. For example, a number of entries 310 in an array 350 can be increased or decreased as queues 120 are respectively added or deleted from hierarchical tree 300. To add a queue 120 for scheduling, a corresponding array 350 is enlarged by adding another entry 310 for storing corresponding multi-parameter status information 220. To remove a queue 120 from hierarchical tree 300, a corresponding entry 310 associated with the removed queue 120 is deleted from array 350. In this way, hierarchical tree 300 is configurable to schedule servicing of a different number of queues 120 at different times.

As previously discussed, multi-parameter status information 220 stored in entries 310 of hierarchical tree 300 are compared to determine which queue 120 is next in line for servicing.

Use of a hierarchical tree 300 to schedule queues 120 for servicing can reduce the need for memory resources (such as a few Kilobytes) per calendar. The savings arises when N queues are placed in M calendars versus M sorting trees, since the sorting trees do not have a fixed overhead per group whereas calendars do. In addition, the resolution of the sorting tree can be increased by increasing the width of the multi-parameter word. The resolution of a calendar can only be increased by adding slots to the calendar. Additionally, calendars only sort based on a single parameter and not a multi-parameter word.

Figure 4:
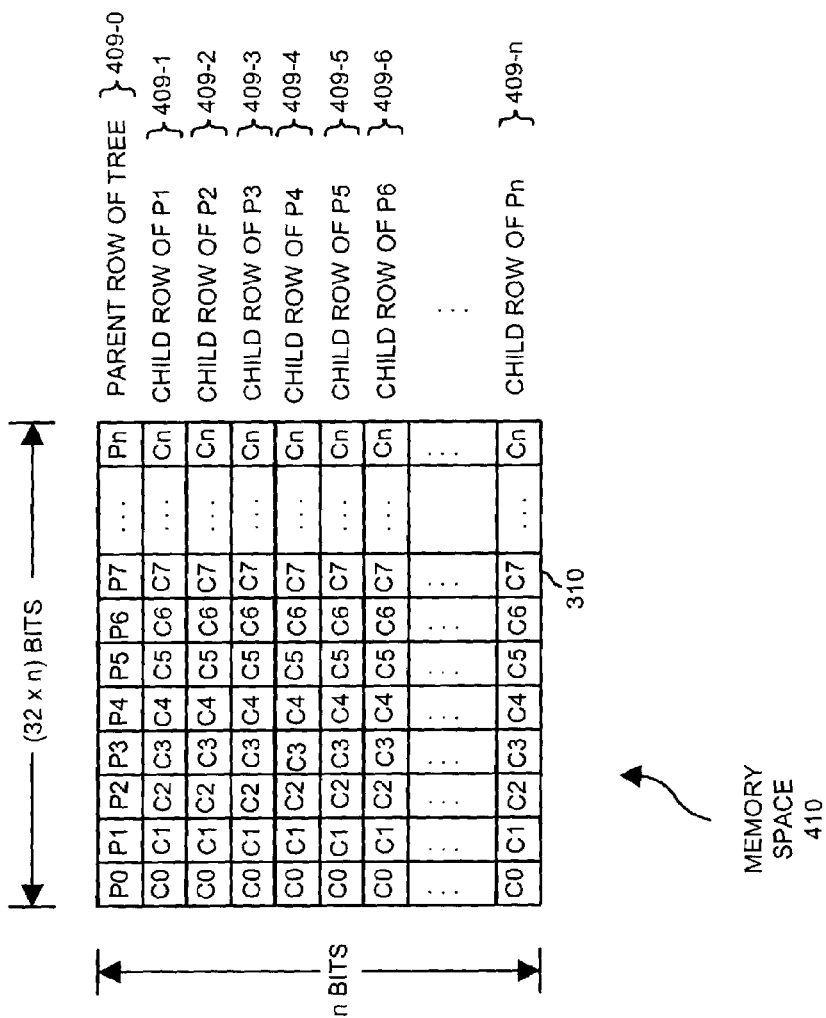
FIG. 4 is a pictorial diagram of partitioned memory space storing entries of the hierarchical tree that schedules queues for servicing.

FIG. 4 is a diagram how a hierarchical tree 300 is stored in memory space 410 of memory device 160. As shown, arrays 350 are stored in corresponding rows 409 of memory space 410. Thus, when n=31 (e.g., when there are thirty-two entries 310 per row 409) and each entry 310 stores thirty-two (32) bits of multi-parameter status information 220 (or key), each row 409 of hierarchical tree 300 stores one thousand twenty-four (1024) bits of multi-parameter status information 220. Similarly, each child row 409 stores an array 350 of one thousand twenty-four (1024) bits of multi-parameter status information 220 associated with queues 120.

This technique of storing related entries 350 in a row 409 of memory space 410 (in an ASIC device) renders it possible to READ an entire row of one thousand twenty-four (1024) bits at the same time. A comparison of the 32 entries contained in one thousand twenty-four (1024) bits yields which of corresponding queues 120 is next scheduled for servicing.

Figure 5:
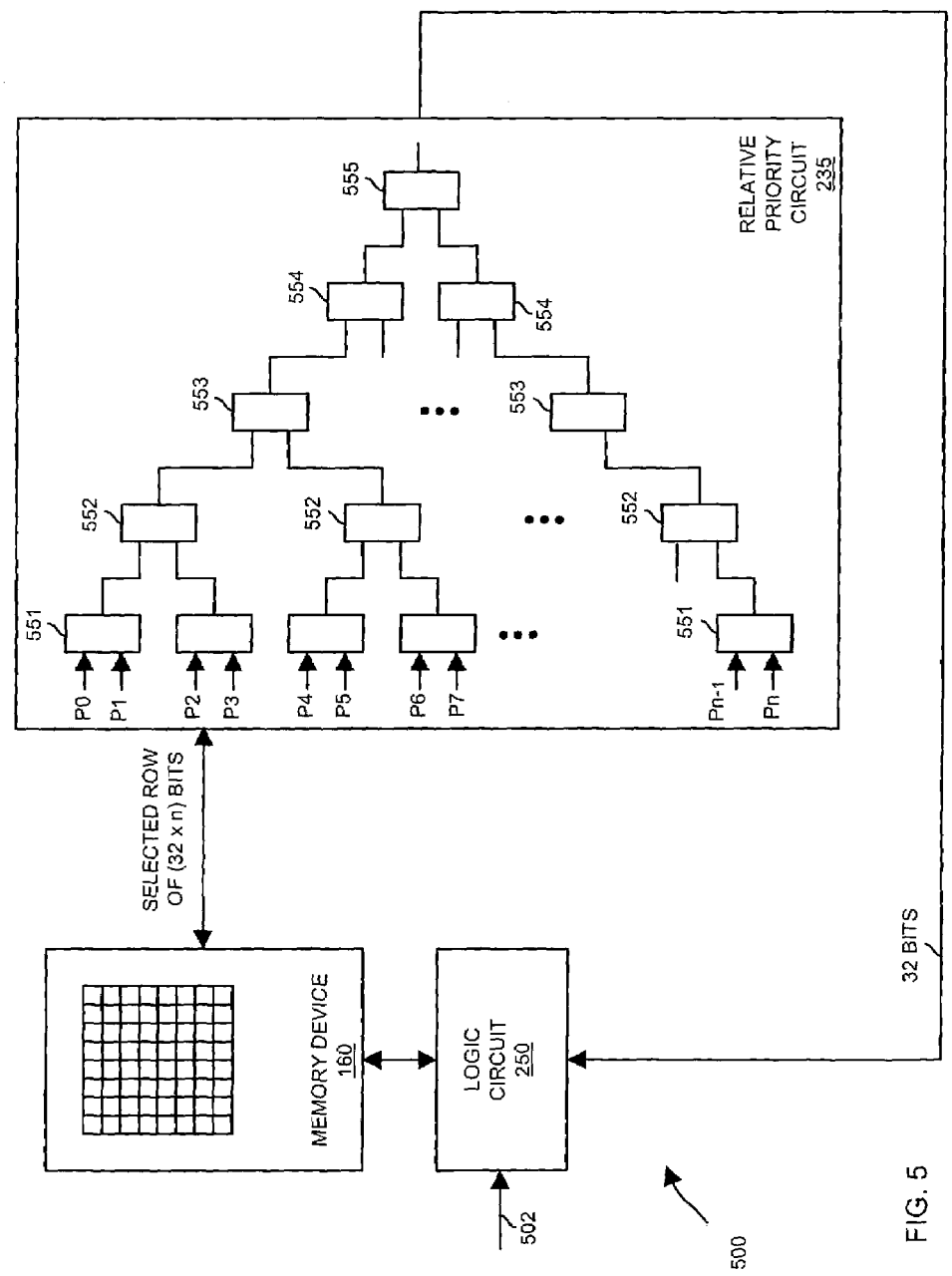
FIG. 5 is a block diagram of a circuit that compares multi-parameter status information associated with multiple queues to identify a next queue for servicing.

FIG. 5 is a block diagram of circuit 500 for maintaining hierarchical tree 300 and servicing corresponding queues 120. As shown, circuit 500 includes memory device 160, logic circuit 250, and relative priority circuit 235. In a typical application, hierarchical tree 300 provides an organization of a sorting tree including ancestry and is not necessarily related to hierarchical scheduling.

During operation, logic circuit 250 receives signal 502 indicating that queues 120 shall be serviced by outputting data packets 189. In response, logic circuit 250 accesses a row 409 of entries 310 at parent level 302 of hierarchical tree 300 stored in memory device 160. As discussed, entries 310 associated with highest priority queues 120 for servicing are stored at parent level 302 of hierarchical tree 300. Thus, entries 310 such as P0, P1, . . . , Pn drive corresponding inputs of compare modules 551 of relative priority circuit 235. Multi-parameter status information 220 associated with the higher relative priority of two queues 120 (such as pair P0 sand P1) is further driven to successive compare modules 552, 553, 554, 555. At a high level, relative priority circuit 235 compares thirty-two entries 310 (of multi-parameter status information 220) to generate one output entry 310 associated with the next scheduled queue 120 for servicing.

Note that related U.S. patent application entitled "Methods And Apparatus For Scheduling Operation of a Data Source", Ser. No. 10/446,981, discusses a similar technique of comparing data information associated with queues to derive which of the queues has a higher associated relative priority for servicing. This technique of comparing multi-parameter status information 220 at successive stages is repeated until a single highest priority queue 120 is identified for servicing. More specifically, outputs of compare modules 551 drive next level of compare modules 552. Outputs of compare modules 552 drive next level of compare modules 553. Outputs of compare modules 553 drive next level of compare modules 554. Outputs of compare modules 554 drive a final compare module 555.

In this way, thirty-two entries 310 of multi-parameter status information 220 are compared to produce an output (entry 310) associated with the highest relative priority or next scheduled queue 120 for servicing. Logic circuit 250 identifies which queue 120 is highest relative priority based upon the status of (16) queue ID bits in data field 360.

Each compare module 551, 552, 553, 554, 555 includes combinational logic or other digital processing resource to determine which entry 310 has a higher associated relative priority for servicing. As previously discussed, each entry 310 includes multiple parameters that are compared in order to determine which queue 120 has a highest associated relative priority for servicing.

Compare modules 551, 552, 553, 554 and 555 determine relative priority based on a comparison of multi-parameter status information 220 (see also FIG. 3). One parameter to help determine relative priority is data type. As mentioned, certain queues 120 store particular types of data that are output before all other data packets 189. Such high relative priority queues can be identified based on data type bits stored in data field 361 in a corresponding entry 310.

Another parameter maintained for certain queues is time stamp information stored in data field 364 of each entry 310. If two queues 120 store a similar type of data packets having the same relative priority classification for servicing, the time stamp can be used as a tie-breaker to determine which of queues 120 will be serviced next. In one application, the time stamp information indicates a relative age of the queues 120. Thus, in this instance, a queue 120 having the oldest time stamp in a class will be serviced before those with younger time stamps in the same class.

Yet another parameter associated with queues 120 as stored in hierarchical tree 300 is "fullness" status indicating whether a corresponding queue 120 has any stored data packets 189 for outputting. When empty, a corresponding queue 120 has a lowest associated relative priority for servicing.

It should be noted that stages of relative priority circuit 235 are optionally configurable. For example, compare modules 551, 552, 553, 554, and 555 can be programmed or configured "on the fly" according to different scheduling rules as deemed appropriate by logic circuit 250. Consequently, queues 120 can be serviced differently depending on present system conditions.

After a scheduled queue 120 is serviced by outputting one or more data packets 189, the corresponding multi-parameter status information 220 associated with the queue 120 is updated. This includes checking whether the queue 120 is empty as a result of outputting data packets 189. If so, data field 363 associated with the queue is set to indicate that the corresponding queue 120 is empty. Consequently, the queue 120 will not be serviced until its status changes to non-empty.

Additionally, after servicing a queue 120 by outputting data packets 189, time stamp information associated with the queue 120 is updated to a next time (such as a virtual time) for servicing the queue 120. For example, in one application, the time stamp information in data field 364 is incremented or advanced in time depending on an amount of data output from the queue 120 and an expected rate of outputting data packets 189 from the queue 120.

After corresponding multi-parameter status information 220 is updated for a serviced queue 120, the newly updated entry 310 (at parent level 302 of hierarchical tree 300) is compared with a priority associated with queues 120 in the related array 350 of entries 310 at child level 304. The corresponding queue 120 with the highest associated relative priority in the corresponding array 350 at child level 304 of hierarchical tree 300 is compared with the updated entry 310 associated with the serviced queue 120. If the highest relative priority entry 310 at child level 304 has a higher associated relative priority for servicing than the multi-parameter status information 220 associated with the serviced queue 120, the corresponding entries 310 are swapped.

As an illustrative example, assume that queue 120 associated with entry P1 was recently serviced. The updated multi-parameter status information 220 in P1 would be compared to the highest priority queue 120 at corresponding related array 350 of entries 310 at child level 304 of hierarchical tree 300. Suppose that C5 has a highest associated priority for servicing among a related array 350 of entries 310 at child level 304. The multi-parameter status information 220 stored in P1 is then compared to that stored in C5. If C5 has a higher associated priority for servicing, multi-parameter status information 225 in C5 is swapped with that for P1. As a result of this swap, hierarchical tree 300 is updated for scheduling queues 120. The new entry 310 in P1 and corresponding queue 120 will now vie for being serviced when entries 310 of array 350 at parent level 302 are again compared to determine the highest priority queue 120.

By way of example, a technique of updating one type of hierarchical tree 300 following a servicing of the highest priority queue 120 in hierarchical tree 300 can involve as few as two READS and two WRITES from/to memory device 160. For example, a first READ of parent entries 310 identifies (via relative priority circuit 235) which queue 120 has a highest associated priority for servicing. After the highest relative priority queue 120 is serviced, the associated multi-parameter status information 220 associated with the serviced queue 120 is updated. A second READ of child row 409 associated with the serviced queue 120 identifies (via relative priority circuit 235) which of queues 120 in the corresponding child row 409 has the highest associated relative priority for servicing. As discussed, the resulting entries 310 are compared and potentially swapped depending on which of the queues 120 has a higher associated relative priority for servicing. To update hierarchical tree 300, two WRITES are then performed to corresponding rows 409 of memory device 160. The first WRITE updates array 350 (more specifically, a particular entry 310) at parent level 302 while the second WRITE updates the corresponding (entry 310) array 350 at child level 304 of hierarchical tree 300. Minimizing a number of READs and WRITEs to memory device 160 increases the speed at which logic device 250 determines which queue 120 to service. It also increases a speed at which logic device 250 thereafter updates hierarchical tree 300.

Another task associated with logic device 250 and, more specifically, queue manager 135 is updating entries 310 in hierarchical tree 300 even though a queue 120 has not been serviced by outputting its data packets 189. For example, an inactive or empty queue 120 can become active again by being filled with data packets 189. To update hierarchical tree 300 and a corresponding entry 310 associated with the queue 120 filled with data packets 189, logic circuit 250 first searches hierarchical tree 300. After locating the appropriate entry 310 associated with the queue 120, logic circuit 250 updates the entry 310 by overwriting old multi-parameter status information 220.

If hierarchical tree 300 is a two-level heap, an entry 310 for an associated queue 120 will not migrate to different arrays 350 at child level 304 of hierarchical tree 300 as the corresponding queue 120 is serviced and its status changes over time. Consequently, an entry 310 associated with a corresponding queue 120 will be located either in a specific entry 310 of array 350 at parent level 302 or in a related array 350 at child level 304. Hierarchical tree 300 is therefore easily searched because a probable location of an entry 310 in hierarchical tree 300 corresponding with a queue 120 is known.

For a two-level heap, an entry 310 corresponding to a particular queue 120 can be identified in as few as two memory READs. A first memory READ involves checking array 350 at parent level 302 of hierarchical tree 300 for a particular queue ID associated with the queue 120 being searched. A second memory READ involves checking an array 350 at a child level 302 of hierarchical tree 300 that otherwise stores an entry 310 associated with the queue 120 being searched. Because it is generally known in which arrays 350 to find an entry 310 corresponding to the queue 120 being searched, minimal time is required to find and update a corresponding entry 310 in hierarchical tree 300. In this instance, an entry 310 can be found in two READs.

Hierarchical tree 300 is optionally a B-tree. In this context, the B-tree optionally includes arrays 350 at multiple child levels 304. For example, each entry 310 at child level 304 itself can have a related array 350 of child entries 310 at yet a next lower level. In this instance, an index table is maintained in logic circuit 250 identifying a possible locations in arrays 350 to find entry 310 associated with a particular queue 120. Based on knowing an array 350 or multiple arrays 350 to find an entry 310, it is a simple task to find and update a corresponding entry 310 in hierarchical tree 300.

Regardless of implementation (such as the type of hierarchical tree 300, namely, heap, B-tree, . . . ), the technique of comparing multi-parameter status information 220 stored in hierarchical tree 300 to service queues 120 provides increased flexibility for scheduling tasks over conventional methods. For example, one parameter of multi-parameter status information 220 (such as data type) associated with queues 120 can be used to categorize queues 120 into specific relative priority classes for servicing. Another parameter associated with queues 120 can be used to differentiate specific relative priority classes of queues 120 into further sub-classes. Consequently, queues 120 are then serviced based on a (cascading) relative priority associated with their priority classification. For queues 120 in the same class, the queues are prioritized for scheduling based on their sub-class derived by a secondary parameter.

Figure 6:
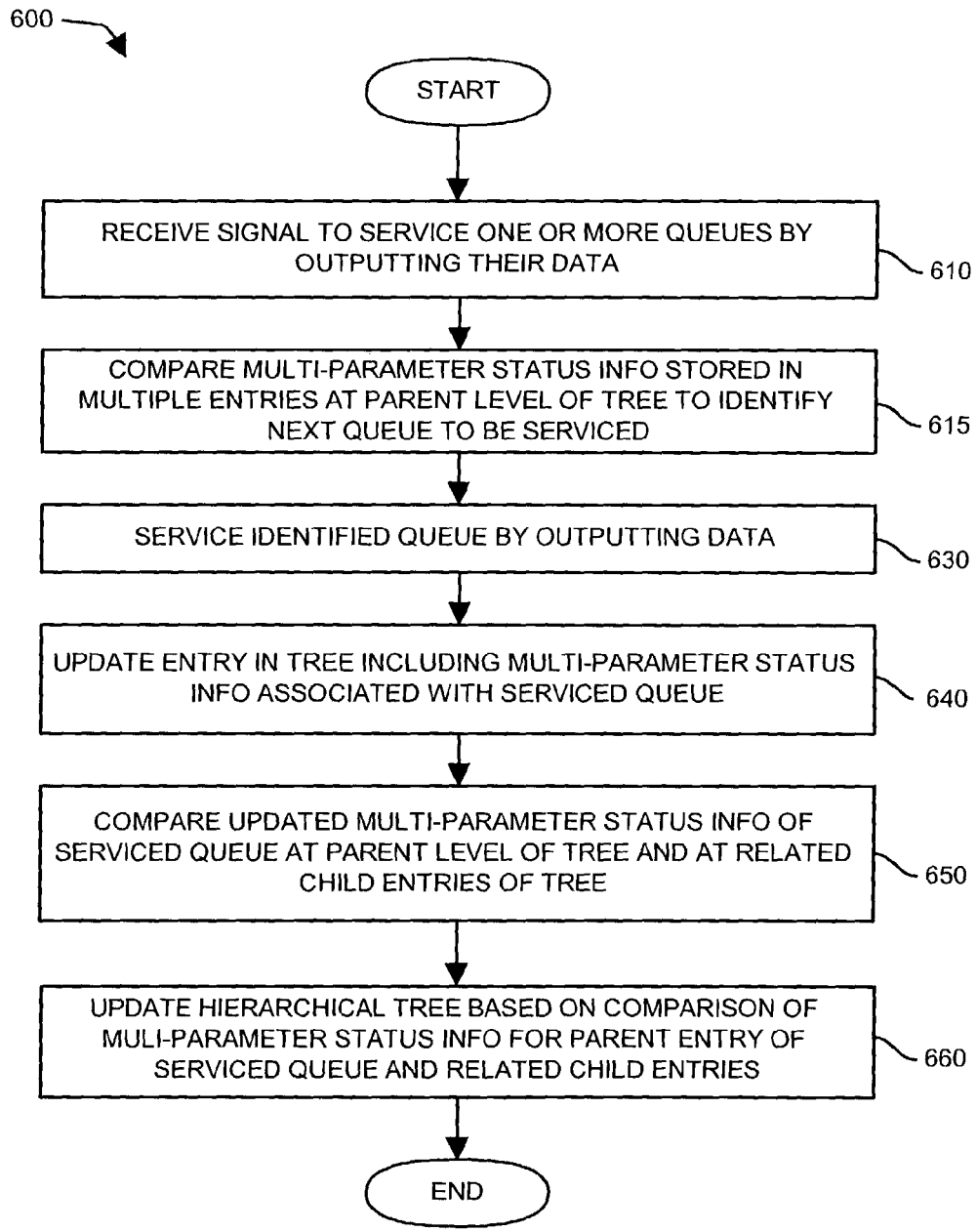
FIG. 6 is a flowchart illustrating a method of utilizing a hierarchical tree to schedule outputting data from multiple queues.

FIG. 6 is a flow chart 600 illustrating a technique of maintaining hierarchical tree 300 and scheduling queues 120 for servicing.

In step 610, logic circuit 250 receives signal 502 indicating that one or more queues 120 is to be serviced by outputting data packets 189.

In step 615, relative priority circuit 235 compares multi-parameter status information 220 stored in entries 310 at parent level 302 of hierarchical tree 300 to identify a next queue 120 for servicing.

In step 630, the identified queue 120 is serviced by outputting data packets 189.

In step 640, logic circuit 250 updates multi-parameter status information 220 associated with a serviced queue 120 to reflect its new status after outputting data packets 189.

In step 650, the updated multi-parameter status information 220 associated with the recently serviced queue 120 is compared to related entries 310 at child level 304 of hierarchical tree 300.

In step 660, hierarchical tree 300 is updated after servicing a queue 120. As discussed, each entry 310 at parent level 302 of hierarchical tree 300 has a related array 350 of entries 310 at a next lower level (child level 304). After a queue 120 is serviced, the updated multi-parameter status information 220 associated with the serviced queue 120 at parent level 302 of hierarchical tree 300 is compared to the relative priority associated with queues 120 stored at a related child level 304 of hierarchical tree 300. If an entry 310 at a child level 304 of hierarchical tree 300 has a relative higher priority than the recently serviced and newly updated queue 120, the updated entry 310 associated with the serviced queue 120 at parent level 302 of hierarchical tree 300 is swapped with the higher relative priority entry 310 at child level 304. This technique of reorganizing entries 310 in hierarchical tree 300 ensures that multi-parameter status information 220 associated with highest relative priority queues 120 are stored at parent level 302.

Figure 7:
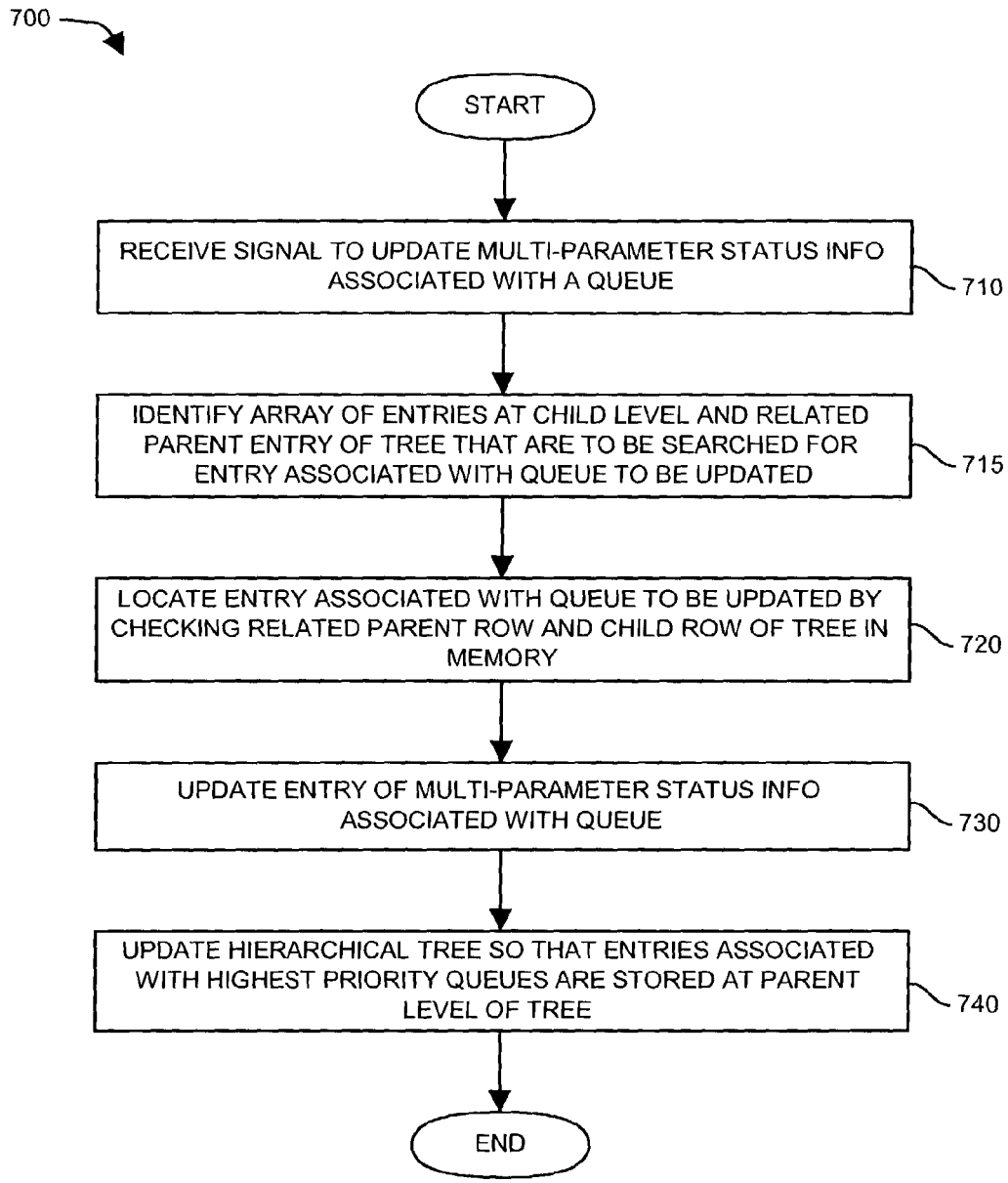
FIG. 7 is a flowchart illustrating a method of searching entries of the hierarchical tree to update multi-parameter status information associated with the queues.

FIG. 7 is a flow chart 700 for searching and updating entries 310 of hierarchical tree 300.

In step 710, logic circuit 250 receives signal 502 indicating that multi-parameter status information 220 associated with a queue 120 needs to be updated. This can occur when a previously empty queue 120 is filled with data packets 189. In response to a change in a queue's 120 status, such as a queue 120 becoming non-empty, hierarchical tree 300 is updated according to the following routine.

In step 715, logic device 250 determines which entries of hierarchical tree 300 must be searched to find an entry 310 corresponding with the queue 120 to be updated. Logic circuit 250 optionally maintains a table to index which arrays 350 a corresponding entry 310 likely resides.

In step 720, queue ID information stored in data field 360 of entries 310 are processed to identify entry 310 of hierarchical tree 300 associated with the queue 120 to be updated.

In step 730, logic device 250 updates multi-parameter status information 220 associated with queue 120. For example, in a case when a queue 120 becomes non-empty, the empty bit stored in data field 363 associated with a corresponding the queue 120 is updated to indicate that the queue is now non-empty.

In step 740, logic circuit updates hierarchical tree 300 so that entries 310 associated with a highest priority queue 120 for servicing are stored at parent level of hierarchical tree 300.

The aforementioned techniques of scheduling queues for servicing using a tree are desirable over conventional techniques. For example, minimal resources such as memory space and processing capability is required to maintain hierarchical tree 300. Hierarchical tree 300 is also easily searched for updating entries 310. Moreover, the use of multi-parameter status information 220 supports more flexible scheduling of tasks.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A method of scheduling an output of data information from multiple queues, the method comprising the steps of:

maintaining a tree having at least two hierarchical levels, a level of the tree including multiple entries, entries of the tree being used to store bits of status information associated with a corresponding one of the queues, the status information for entries of the tree including multiple parameters that are used to determine a relative order for servicing the queues; and comparing the status information including the multiple parameters associated with two or more entries in a level of the tree to identify a higher relative priority queue for servicing;

wherein comparing the status information including the multiple parameters associated with two or more entries in a level of the tree to identify a higher relative priority queue for servicing comprises:

comparing type fields of two or more entries in the level of the tree, the type fields indicating a type of data stored in each queue associated with each entry and the type fields identifying a priority of servicing of each queue associated with each entry, comparing status information fields of two or more entries in a level of the tree, the status information fields indicating one of the activity or the inactivity of each queue associated with each entry, comparing an empty queue field of two or more entries in the level of the tree, the queue empty fields indicating one of the queue being empty or the queue being non-empty for each queue associated with each entry, and comparing time stamp fields of two or more entries in a level of the tree, the time stamp information indicating a relative age of each queue associated with each entry; and further comprising selecting one of the queue associated with one of the entries as the higher relative priority queue for servicing based upon the comparison of the type fields of two or more entries in the level of the tree, the status information fields of two or more entries in a level of the tree, the empty queue field of two or more entries in the level of the tree, and the time stamp fields of two or more entries in a level of the tree.

2. A method as in claim 1 further comprising:
in response to comparing the status information associated with the multiple queues, servicing a selected queue having an entry at a parent level of the tree by outputting data from the selected queue; and
after servicing the selected queue, updating the status information of the entry in the tree associated with the selected queue.

3. A method as in claim 2 further comprising:
comparing the updated status information at a parent level of the tree to status information stored in corresponding related child entries of the tree; and
as a result of comparing, swapping status information associated with a highest relative priority queue of the multiple related child entries of the tree with the updated status information at a parent level of the tree.

4. A method as in claim 1, wherein maintaining the tree includes:
maintaining an entry in the tree for each of the multiple queues even if a queue is empty.

5. A method as in claim 1, wherein storing bits of status information includes:
storing time stamps associated with corresponding queues to track a relative age of queues with respect to each other, the time stamps being used in conjunction with at least one other parameter to identify a highest relative priority queue in the tree for servicing.

6. A method as in claim 5, wherein storing bits of status information further includes:
storing data type information associated with corresponding queues to track a type of data stored in the queues, the data type information being used in conjunction with the time stamps to identify a highest relative priority queue in the tree for servicing.

7. A method as in claim 1, wherein storing bits of status information includes:
storing data type information associated with corresponding queues to track a type of data stored in the queues, the data type information being used in conjunction with at least one other queue parameter to identify a highest relative priority queue in the tree for servicing.

8. A method as in claim 1, wherein the step of maintaining a tree includes:
maintaining a tree with only two levels including one parent level and one child level, each of the levels including multiple entries to store status information associated with the queues.

9. A method as in claim 8, wherein the step of maintaining a tree further includes:
maintaining the tree as a searchable two-level heap.

10. A method as in claim 1, wherein the step of maintaining a tree further includes:
maintaining a parent level of the tree to include at least eight entries for storing status information associated with the queues; and
maintaining at least eight related child entries at a lower level of the tree for entries at the parent level.

11. A method as in claim 1, wherein the step of maintaining the tree includes:
for parent entries of the tree and related child entries of the tree, storing the entries in a contiguous space of a memory device.

12. A method as in claim 11, wherein the step of maintaining the tree includes:
maintaining status information associated with the queues in on-chip memory of an ASIC (Application Specific Integrated Circuit) device.

13. A method as in claim 1, wherein the step of maintaining a tree further includes:
maintaining the tree as a B tree.

14. An electronic circuit to schedule an output of data information from multiple queues, the circuit comprising:
a memory device to maintain a tree having at least two hierarchical levels, at least one level of the tree including multiple entries to store multi-parameter status information associated with the queues; and
a logic circuit that compares the multi-parameter status information associated with each of two or more queues to identify a highest relative priority queue for servicing;
wherein, when comparing the multi-parameter status information including associated with two or more entries in a level of the tree to identify the higher relative priority queue for servicing comprises, the logic circuit is configured to:
compare type fields of two or more entries in the level of the tree, the type fields indicating a type of data stored in each queue associated with each entry and the type fields identifying a priority of servicing of each queue associated with each entry,
compare status information fields of two or more entries in a level of the tree, the status information fields indicating one of the activity or the inactivity of each queue associated with each entry,
compare an empty queue field of two or more entries in the level of the tree, the queue empty fields indicating one of the queue being empty or the queue being non-empty for each queue associated with each entry, and
compare time stamp fields of two or more entries in a level of the tree, the time stamp information indicating a relative age of each queue associated with each entry; and
furthermore select one of the queue associated with one of the entries as the higher relative priority queue for servicing based upon the comparison of the type fields of two or more entries in the level of the tree, the status information fields of two or more entries in a level of the tree, the empty queue field of two or more entries in the level of the tree, and the time stamp fields of two or more entries in a level of the tree.

15. An electronic circuit as in claim 14 further comprising:
a processor device that, in response to comparing the status information associated with the two or more queues, services a selected queue having an entry at a parent level of the tree by outputting data from the selected queue, the processor device updating the multi-parameter status information stored in the entry of the tree corresponding to the selected queue after servicing.

16. An electronic circuit as in claim 15, wherein the logic circuit compares the updated status information at a parent level of the tree to status information stored in corresponding multiple related child entries of the tree and, as a result of comparing, the processor device swaps multi-parameter status information associated with a highest relative priority queue of the multiple related child entries of the tree with the updated status information at a parent level of the tree.

17. An electronic circuit as in claim 14, wherein an entry in the tree is maintained for a queue even if it is empty.

18. An electronic circuit as in claim 14, wherein the multi-parameter status information includes time stamp information associated with corresponding queues to track a relative age of queues with respect to each other, the time stamp information being used in conjunction with at least one other queue parameter to identify a highest relative priority queue in the tree for servicing.

19. An electronic circuit as in claim 18, wherein the multi-parameter status information includes bits that identify a type of data stored in the queues, the data type information being used in conjunction with the time stamps to identify a highest relative priority queue in the tree for servicing.

20. An electronic circuit as in claim 14, wherein each entry in the tree storing the multi-parameter status information includes bits that identify a type of data stored in a corresponding queue.

21. An electronic circuit as in claim 14, wherein the tree includes one parent level and one child level, each of the levels including multiple entries to store status information associated with the queues.

22. An electronic circuit as in claim 21, wherein the tree is a searchable two-level heap.

23. An electronic circuit as in claim 14, wherein a parent level of the tree includes at least eight entries for storing status information associated with the queues, at least one of the entries at the parent level of the tree having at least eight related child entries at a next lower level of the tree.

24. An electronic circuit as in claim 14, wherein an array of parent entries of the tree and arrays of corresponding child entries of the tree are stored in contiguous space in the memory device.

25. An electronic circuit as in claim 24, wherein the memory device that stores the tree is on-chip memory of an ASIC (Application Specific Integrated Circuit) device.

26. A method as in claim 14, wherein the tree is a B tree including multiple entries.

27. In a data communications device including multiple queues, a system for scheduling an output of data from the queues comprising:
   a memory device to maintain a tree having at least two hierarchical levels, each level of the tree including multiple entries to store multi-parameter status information associated with the queues; and
   means for comparing multi-parameter status information associated with each of two or more queues to identify a highest relative priority queue for servicing;
   wherein means for comparing the status information including the multiple parameters associated with two or more entries in a level of the tree to identify a higher relative priority queue for servicing comprises:
   means for comparing type fields of two or more entries in the level of the tree, the type fields indicating a type of data stored in each queue associated with each entry and the type fields identifying a priority of servicing of each queue associated with each entry,
   means for comparing status information fields of two or more entries in a level of the tree, the status information fields indicating one of the activity or the inactivity of each queue associated with each entry,
   means for comparing an empty queue field of two or more entries in the level of the tree, the queue empty fields indicating one of the queue being empty or the queue being non-empty for each queue associated with each entry, and
   means for comparing time stamp fields of two or more entries in a level of the tree, the time stamp information indicating a relative age of each queue associated with each entry; and
   further comprising means for selecting one of the queue associated with one of the entries as the higher relative priority queue for servicing based upon the comparison of the type fields of two or more entries in the level of the tree, the status information fields of two or more entries in a level of the tree, the empty queue field of two or more entries in the level of the tree, and the time stamp fields of two or more entries in a level of the tree.

28. A computer program product including a computer-readable medium having instructions stored thereon for processing data information, such that the instructions, when carried out by a processing device, enable the processing device to perform the steps of:
   maintaining a tree having at least two hierarchical levels, each level of the tree including multiple entries, entries of the tree being used to store bits of status information associated with a corresponding one of the queues, the status information for entries of the tree including multiple parameters that are used to determine a relative order for servicing the queues; and
   comparing the status information including the multiple parameters associated with two or more entries in a level of the tree to identify a highest relative priority queue for servicing
   wherein comparing the status information including the multiple parameters associated with two or more entries in a level of the tree to identify a higher relative priority queue for servicing comprises:
   comparing type fields of two or more entries in the level of the tree, the type fields indicating a type of data stored in each queue associated with each entry and the type fields identifying a priority of servicing of each queue associated with each entry,
   comparing status information fields of two or more entries in a level of the tree, the status information fields indicating one of the activity or the inactivity of each queue associated with each entry,
   comparing an empty queue field of two or more entries in the level of the tree, the queue empty fields indicating one of the queue being empty or the queue being non-empty for each queue associated with each entry, and
   comparing time stamp fields of two or more entries in a level of the tree, the time stamp information indicating a relative age of each queue associated with each entry; and
   further comprising selecting one of the queue associated with one of the entries as the higher relative priority queue for servicing based upon the comparison of the type fields of two or more entries in the level of the tree, the status information fields of two or more entries in a level of the tree, the empty queue field of two or more entries in the level of the tree, and the time stamp fields of two or more entries in a level of the tree.

29. The method of claim 1, wherein:
maintaining the tree having at least two hierarchical levels comprises maintaining the tree with only two levels including one parent level and one child level, the parent level having multiple entries used to store bits of status information associated with a corresponding one of the queues, each entry at the parent level having a related array of child entries in the child level, each child entry at the child level having multiple entries used to store bits of status information associated with a corresponding one of the queues; and comparing the status information including the multiple parameters associated with two or more entries in a level of the tree comprises comparing the multiple parameters of each entry in the parent level to identify the higher relative priority queue in the parent level for servicing; and wherein the method further comprises:

servicing the higher relative priority queue in the parent level by outputting data from the higher relative priority queue;

updating the time stamp field of the status information of the entry associated with the higher relative priority queue to a subsequent time for servicing of the queue associated with the entry;

comparing the updated status information of the entry associated with the higher relative priority queue at the parent level to status information stored in the corresponding related array of child entries in the child level to detect relative priorities between the entry associated with the higher relative priority queue at the parent level and the related array of child entries in the child level; and as a result of comparing, swapping status information of the entry associated with the higher relative priority queue in the parent level with status information of an entry in the related array of child entries in the child level when the entry in the child level has a relative higher priority than the entry associated with the higher relative priority queue at the parent level.

* * * * *